United States Patent [19]

Ancelle et al.

[11] Patent Number: 4,592,841

[45] Date of Patent: Jun. 3, 1986

[54] EQUIPMENT AND PROCESS FOR THE TREATMENT OF SWIMMING POOL WATER WITH A SEMI-PERMEABLE MEMBRANE

[75] Inventors: Bernard Ancelle; Serge Lambert, both of Lyons, France

[73] Assignee: Rhone-Poulenc Specialites Chimiques, Courbevoie, France

[21] Appl. No.: 607,451

[22] Filed: May 7, 1984

[30] Foreign Application Priority Data

May 5, 1983 [FR] France ............................. 83 07741

[51] Int. Cl.⁴ ............................................. B01D 13/00
[52] U.S. Cl. ................................. 210/651; 210/195.2; 210/169
[58] Field of Search .................... 210/258, 257.2, 169, 210/321.1, 651, 195.2, 433.2

[56] References Cited

U.S. PATENT DOCUMENTS

| 3,630,378 | 12/1971 | Bauman | 210/257.2 X |
| 4,211,249 | 7/1980 | Richards | 210/169 X |
| 4,461,703 | 7/1984 | Vetter | 210/169 |

OTHER PUBLICATIONS

Askim et al., "Reverse Osmosis Can—Potable Water", from Water and Sewage Works, 10-1976, pp. 76–79.

Primary Examiner—Frank Spear
Attorney, Agent, or Firm—Burns, Doane, Swecker & Mathis

[57] ABSTRACT

In the treatment of the swimming pool water, the water is continuously withdrawn from the pool and brought into contact with semi-permeable membranes of a separating apparatus. The fraction of the water which has passed through the membranes is returned to the pool.

14 Claims, 1 Drawing Figure

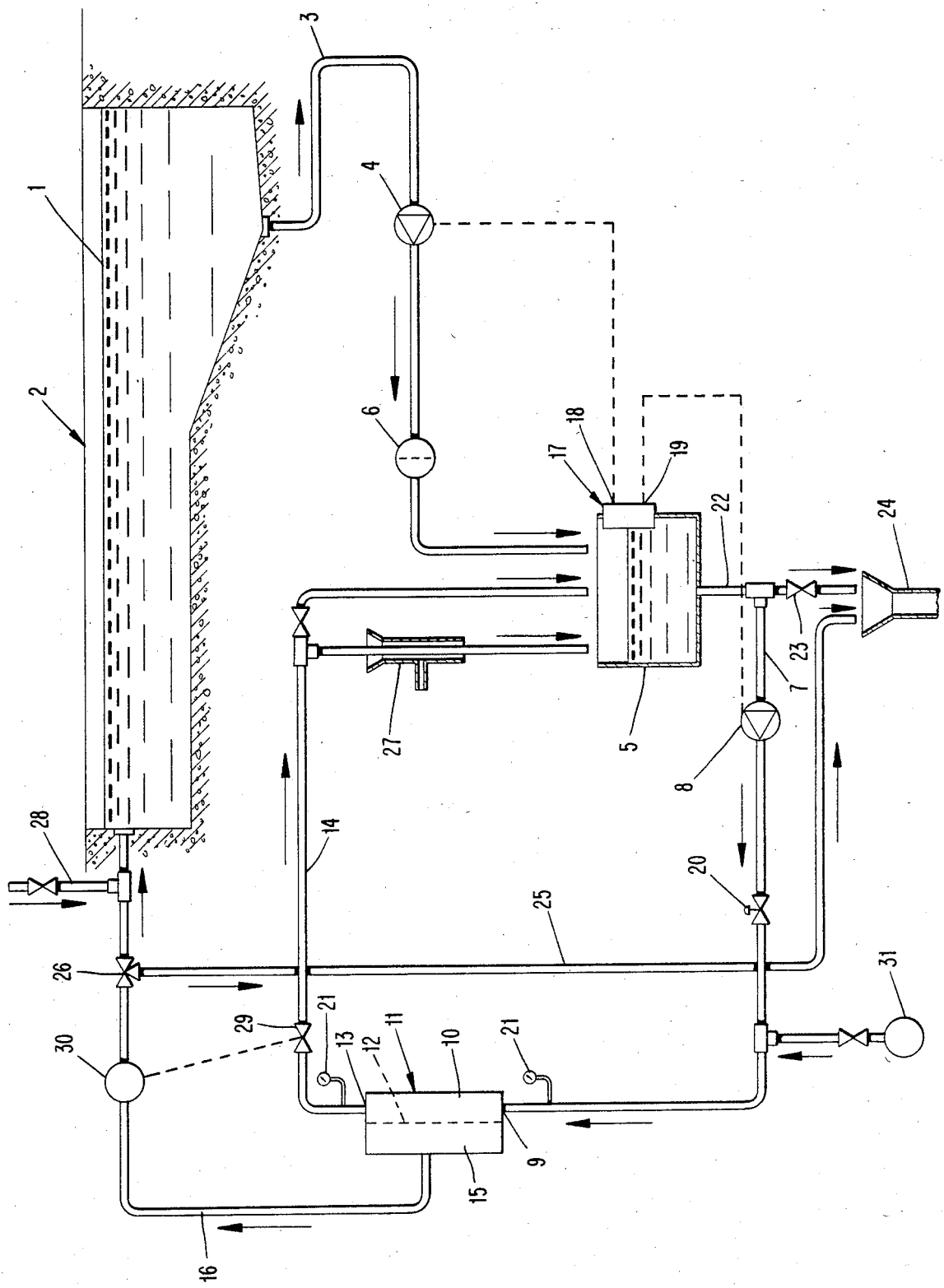

4,592,841

EQUIPMENT AND PROCESS FOR THE TREATMENT OF SWIMMING POOL WATER WITH A SEMI-PERMEABLE MEMBRANE

BACKGROUND OF THE INVENTION

Field of the Invention

The present invention relates to equipment and a process for the treatment of swimming pool water.

Swimming pool water is currently treated by continually passing part of the water from the swimming pool either over filters containing sand or over filters containing diatomaceous earth, after a coarse purification for removing materials such as, for example, hair. The water treated in this way then returns to the pool after the addition of a chemical product such as chlorine, chlorine dioxide, bromine, iodine, ozone or the like, in order to disinfect it.

The known sand filters contain either one layer of sand of uniform particle size, or several layers (generally 4 to 5) of sand of decreasing particle size, the layer of sand of largest particle size corresponding to the one through which the treated water leaves. To obtain clear water, it is essential to add a flocculant to the water which is to be treated, because the sand does not retain the particles whose diameter is less than 15 or 20 microns. The flocculant used is aluminum sulphate or aluminium chlorides, which are less dependent on the pH. However, despite repeated washing in counter-current, the water succeeds in passing through preferential paths. It is then necessary to use a special descaling product.

The diatomaceous earth filters are of several types. Some have automatic unclogging and others are without automatic unclogging and involve the continuous formation of alluvial deposits. Being very finely ground, the diatomaceous earth can retain particles ranging up to 1 micron in diameter. On the other hand, the fineness of the interstices causes rapid clogging. This is slowed down by restricting the filtration rate. However, the filter cloths require regular maintenance, the scale being removed by a specific product and the grease by a basic product.

Following this filtration over sand filters or diatomaceous earth filters, it is essential to disinfect the water. Chemical treatments or physical treatments are used for this purpose. The chemical treatments are generally based on chlorine, bromine, iodine, ozone or, preferably, chlorine dioxide. The physical treatments are based on ionizing radiation or ultraviolet radiation.

One subject of the present invention is a process and equipment for the treatment of swimming pool water which avoid the disadvantages of the processes and equipment of the prior art.

One object of the present invention is to provide a process and equipment of high reliability which can be used manually or automatically and have great versatility of operation.

Another object of the present invention is to provide a process and equipment which ensure a higher degree of safety in the treatment of swimming pool water, especially in bacteriological terms.

Another object of the present invention is to provide a process and equipment which are easy to operate.

Another object of the present invention is to provide a process and equipment which make it possible to avoid polluting the environment.

Another object of the present invention is to provide a process and equipment which makes it possible to save energy.

Another object of the present invention is to provide a process and equipment which make it possible to dispense with the conventional devices for filtration over sand or diatomaceous earth.

Another object of the present invention is to provide a process and equipment which make it possible at least partly to omit the chemical disinfecting treatments.

Another object of the present invention is to provide a process and equipment which make it possible to treat smaller quantities of the water contained in the swimming pool, per unit time (for example, per hour), while at the same time encuring that the water in the pool is in perfect condition.

SUMMARY OF THE INVENTION

A process for the treatment of swimming pool water has now been found which is characterized in that the water from the swimming pool is brought into contact with a separating apparatus containing a semi-permeable membrane, and in that the fraction which has passed through the membrane is fed back into the pool; it is this process which forms the subject of the invention.

The present invention, also relates to equipment for the treatment of swimming pool water, characterized in that it comprises means for continuously withdrawing the water from the swimming pool, means for bringing this withdrawn water into contact with the semi-permeable membrane of a separating apparatus, and means for enabling the fraction which has passed through the semi-permeable membrane to return to the said swimming pool.

THE DRAWING

The description of the process and equipment according to the present invention will be understood more clearly with the aid of the attached FIGURE, which illustrates a preferred embodiment of the invention by way of a non-limiting example and with no precise scale.

The FIGURE depicts, schematically, a treatment cycle and equipment through which water travels in accordance with the present invention.

DETAILED DESCRIPTION OF THE INVENTION

The following procedure can be adopted for carrying out the process according to the present invention, reference being made more particularly to the FIGURE.

The water 1 in a swimming pool 2 is withdrawn through a pipe 3 by means of a pump 4. This pipe 3 leads to a so-called recycling tank 5 into which the water withdrawn by the pipe 3 is discharged. This water advantageously undergoes coarse filtration before being discharged into the tank 5. For this purpose, a filter 6 is provided in the pipe 3 in order to remove materials such as, for example, hair. This filter 6 can be, for example, a conventional filter having a curved grid with transverse slots, such as the filters marketed by DOOR OLIVER or by PHILIPPE. The water contained in the tank 5 is withdrawn therefrom and into a pipe 7 by means of a pump 8. The pipe 7 leads to the inlet 9 of an upstream compartment 10 of a separating apparatus 11 containing a semi-permeable membrane 12. The water circulates in contact with the membrane 12 inside the compartment 10 of the apparatus 11 and the fraction of the water which has not passed through the membrane 12 leaves the upstream compartment 10 through an outlet 13 and returns to the recycling tank 5 by means of a pipe 14. The fraction of the water which passes through the membrane 12 enters a downstream compartment 15 of the separator 11 and is sent into the water 1 in the swimming pool 2 by means of a pipe 16.

As shown in the FIGURE, the tank 5 is advantageously provided with an electric device 17 for regulating the water level. The device 17 stops the pump 4 when a high point 18 is reached, so that the tank does not overflow. The device 17 stops the pump 8 when the water level in the tank 5 reaches a low point 19, in order to avoid a situation in which the module 11 contains no liquid. In the remainder of the description, the separating apparatus 11 containing a semi-permeable membrane 12 will also be referred to as the "separator" or "module".

Furthermore, a protection valve 20 with a gradual opening action is arranged on the pipe 7, and manometers 21 make it possible to measure the relative pressure in the upstream compartment 10 of the separating apparatus 11.

In order to make the process automatic, a control valve 29 is arranged downstream of the separating apparatus 11 in the pipe 14. This valve is governed (via known electrical means) by a flow meter 30 provided in the pipe 16 through which treated water is returning to the pool 2. If, during treatment, the chosen ultrafiltration rate drops in the pipe 16 as a result of clogging of the membrane, the flow meter 30 actuates the control valve 29 and closes it slightly so that the pressure across the membrane increases in the module 11. Accordingly, the ultrafiltration rate thereby increases and returns to the desired value. In order to be sure that the pressure in the module does not reach excessively high values, it is only necessary to choose an appropriate pump 8.

To empty the tank 5 when necessary, a pipe 22 can be in communication with the pipe 7, this pipe 22 possessing a valve 23 and discharging into a sewer 24. Likewise, during the washing or unclogging of the semi-permeable membrane 12 when it has lost its ultrafiltration properties, as will be hereinafter explained, a pipe 25 can be connected in communication with the pipe 16 via a three-way valve 26. This pipe 25 discharges into the sewer, for example, as shown. By way of variants, this pipe 25 can discharge into the recycling tank 5, and the pipe 22 can be connected directly to the tank 5.

It can be advantageous, moreover, to provide the pipe 14, before it discharges into the tank 5, with an aerating device 27 known per se, in order to introduce air into the water before it flows into the recycling tank. Thus, the air entrained by the device 27 is both dissolved and in the form of dispersed bubbles when the water in the pipe 14 discharges into the recycling tank. This device 27, which is known as a water-jet pump, a venturi device or a gas-liquid mixer, is described, for example, in French Patent No. 2,430,451 in the name of RHÔNE-POULENC. As a variant, the device 27 can be replaced with a similar or different device 31 for injecting air under pressure, which is arranged in the pipe 7 upstream of the separating apparatus 11. This device 31 makes it possible, in particular, to slow down the clogging of the membranes.

In certain cases, it may be advantageous, as a safety measure, to introduce small quantities of a disinfecting product, such as, for example, chlorine or ozone, into the water which has passed through the semi-permeable membrane 12 of the separating apparatus before it is introduced into the swimming pool 2. This is done by providing a pipe 28 in communication with the pipe 16. The purpose of adding this disinfecting product is essentially to maintain the water in the pool at a certain degree of biological purity in respect of the impurities which can be introduced by the users of the pool, because the sterile ultrafiltered water coming from the separating apparatus 11 is free of all bacteriological germs. By way of comparison, only 0.4 to 1.4 ppm (parts per million) of chlorine or an equivalent quantity of ozone need be generally introduced through the pipe 28 in the present invention, whereas in the conventional processes for the treatment of water by filtration over sand or diatomaceous earth, 2 to 10 ppm of chlorine are introduced.

The separating apparatuses 11 which can be used for carrying out the process according to the present invention are of any known type. They can contain plane membranes optionally rolled-up into spirals, hollow fibers, tubular membranes or the like. Examples which may be mentioned of separating apparatuses 11 containing semi-permeable membranes are those patented by RHÔNE-POULENC in its French Patent Nos. 2,127,155, 2,141,417, 2,165,042, 2,392,696, 2,400,380, and 2,471,507. Examples which may be mentioned of separating apparatuses 11 containing semi-permeable membranes in the form of hollow fibers are the apparatuses described in French Patent Nos. 2,193,633, 2,214,502, 2,231,421 and 2,236,537. An example which may be mentioned of separating apparatuses 11 containing tubular membranes is that described in French Patent No. 2,294,730. The membranes 12 used for carrying out the process according to the present inventoin can be isotropic (or homogeneous for symmetrical) membranes, but it is more advantageous to use anisotropic membranes. Examples which may be mentioned are the semi-permeable membranes described in French Patent Nos. 1,584,659, 2,144,922, 2,040,950, 2,079,699 and 2,331,602.

If these membranes are in anisotropic form, they possess a skin which ensures the semi-permeability (or permiselectivity) and whose thickness is generally between 0.1 to 5 microns, and a porous layer which is not semi-permeable and whose thickness is generally between 50 and 300 microns, preferably between 100 and 200 microns. The porous layer, which is called the support layer (or substrate) and whose pore diameter is generally between 1 and 20 microns, gives the mechanical properties of such membranes and offers a moderate resistance to the flow of fluids. The skin, or stopping layer, has pores whose diameter is generally between 0.001 micron (10 Å) and 0.1 micron (1000 Å), preferably between 0.005 micron (50 Å) and 0.05 micron (500 Å).

If these membranes are in isotropic or homogeneous form, they are microporous, the pore diameter generally being between 0.005 and 0.1 micron, preferably between 0.01 and 0.05 micron.

Advantageously, the homogenous or anisotropic membranes can be reinforced by a woven fabric, for example made of polyamide (NYLON) or polyethylene glycol terephthalate (TERGAL), or by a nonwoven, for example made of polyethylene glycol terephthalate (BIDIM).

The membranes used advantageously have a cut-off threshold of between 5000 and 500,000, preferably of between 10,000 and 100,000. The term "cut-off threshold" denotes the approximate limiting molecular weight of proteins above which more than 95% by weight of the said proteins is retained by the membrane.

The water ultrafiltration rate of the membranes under a differential pressure of 1 bar is generally greater than 100 liters/m$^2$.h (liters per square meter per hour). The membranes are chosen so as to make it possible to obtain the greatest possibile ultrafiltration rate while at the same time giving maximum retention of the germs, bacteria, microorganisms and other suspended matter, so that the water leaving the pipe 16 to enter the pool 2 is sterile and free of suspended matter.

The speed of circulation of the water in the upstream compartment 10 of the separating apparatus 11 is generally between 0.3 and 5 m/s (meters per second), preferably between 0.5 and 3 m/s. The flow rate of the water between the tank 5 and the inlet 9 of the upstream compartment 10 of the separating apparatus 11 is generally 5 to 20 times greater, preferably 7 to 15 times greater, than that of the water passing through the semi-permeable membranes 12 in the downstream compartment 15.

Furthermore, the average pressure difference between the upstream compartment 10 and downstream compartment 15 of the separating apparatus 11 is generally between 0.4 and 20 bar, preferably between 0.5 and 5 bar, the pressure in the downstream compartment 15 being as close as possible to atmospheric pressure.

With the equipment and the process according to the present invention, it has been found that it is possible to treat much smaller quantities per hour of the water 1 from the pool 2 while at the same time ensuring that it is of good quality, relative to the processes of the prior art involving filtration over sand or diatomaceous earth. By way of comparison, it is possible to treat volumes of water 1 from the pool 2 which are 5 to 25 times smaller, preferably 7 to 15 times smaller, than those treated with the processes of the prior art, while at the same time ensuring that the water 1 in the pool 2 is of equal or even superior quality.

As regards the volume of the recycling tank 5, its dimensions are not critical. For example, it is possible to use a tank 5 of about 2 m$^3$ for swimming pools 2 containing 400 to 1800 m$^3$ of water.

Of course, during the treatment of the water 1 from the swimming pool 2, the ultrafiltration rate through the semipermeable membranes 12 may drop with time. It is then necessary to wash the membranes so that they recover their ultrafiltration properties, that is to say, so that the flow rate of the fluid passing through them improves. For example, it is possible to wash the membranes with a 1% aqueous solution of EDTA (ethylenediaminetetraacetic acid) and a 2% (by weight) aqueous solution of sodium hydroxide and then to rinse them with an aqueous solution of nitric acid at pH 4. Instead of washing the membranes with solutions of EDTA and sodium hydroxide, they can be washed with Javel water of, for example, 0.1 degree on the chlorometric scale. When the washing and rinsing are carried out, the pump 4 has been stopped beforehand and the three-way valve 26 has been set so that the liquid passing through the membrane 12 runs through the pipe 25. At this point the recycling tank 5 contains products which have not passed through the membrane 12. Before those contents are emptied into the sewer 24, the bacteria, microbes or other germs can be destroyed by the addition of poisons for such matter, for example, by the addition of Javel water. Obviously, when the tank 5 is emptied, the overflow system 17 and the pump 8 are stopped, and the valve 23 is opened. Then, after the valve 23 has been closed, the products resulting from washing of the membranes 12 are introduced into the tank 5, and the pump 8 is then started. If it is desired to recycle the fractions of the washing and rinsing liquids passing through the membrane 12, the pipe 25 can be directed into the tank 5.

With the equipment described above, which corresponds to that shown in the attached figure, it was possible continuously to treat the water 1 from a municipal swimming pool 2 of 400 m$^3$, this pool having one-third of its area at a depth of less than 1.5 m and the remaining two-thirds at a depth of more than 1.5 m (wtihout diving pool). With the conventional processes involving filtration over diatomaceous earth, it is necessary to treat the 400 m$^3$ of the pool 2 in three hours, which requires a flow rate of 133 m$^3$/hour (cubic meters per hour) in the external treatment circuit. Furthermore, it is necessary in the prior art to add from 2 to 10 ppm of chlorine to the pool 2 in order to ensure good bacteriological and biological purity. Using the equipment according to the present invention, it was possible to treat the same volume (400 m$^3$) of water 1 from the pool 2 in 36 hours and 30 minutes, that is to say with an output flow rate of the water 1 into the pipe 3 of 15 m$^3$/hour. The recycling tank 5 had a capacity of 2 m$^3$ and the separating apparatus 11 consisted of two plane modules containing semi-permeable membranes 12, marketed by Rhône-Poulenc under the name "PLEIADE UFP 70". These two modules, assembled in parallel, each had a useful area of semi-permeable membranes of 50 m$^2$ and allowed a total ultrafiltration rate of 15 m$^3$/hour. Each of the modules or separating apparatuses 11 included membrane support-plates, the latter forming six sub-assemblies (each of 24 support-plates) in which the water to be treated circulated in parallel between the membranes of two consecutive support-plates, the water to be treated circulating in series from one sub-assembly to the next. The membranes with which these modules were equipped were those marketed by Rhône-Poulenc under the name IRIS 3038. These anisotropic membranes have a total thickness of 160 microns and are reinforced with a woven fabric based on coarse polyamide fiber. They have a 0.4 micron thick stopping layer whose pore diameter is between 50 and 200 Å (1 Å=10$^{-10}$m). These membranes are obtained from a terpolymer based on acrylonitrile, methyl methacrylate ($\sim$7% by weight) and sodium methallylsulphonate, this terpolymer having an ion capacity of between 70 and 80 meq/kg (milliequivalents per kilogram) and a specific viscosity of 0.35 at 20° C. in a dimethylformamide solution containing 2 g/liter. These membranes can withstand a pH of between 1 and 12 and a temperature of 50° C. Their ultrafiltration rate is 400 liters/m$^2$.hoir for pure water under a differential pressure of 1 bar at 20° C. Their cutoff threshold is between 15,000 and 20,000, this cut-off threshold corresponding to the approximate limiting molecular weight of proteins above which more than 95% by weight of the said proteins is retained by the membranes.

The flow rate of the water circulating in each separating apparatus 11 was 70 m$^3$/hour, the speed of the water in contact with the membranes 12 being 2 m/s. The relative average pressure in the "upstream" compartments 10 of the separating apparatuses 11 was kept at a value of between 1.5 and 2.5 bar in the course of the treatment, the increase in pressure corresponding to clogging of the membranes 12 with time.

The water obtained in the "downstream" compartments 15 of the separating apparatuses 11 was free of micro-organisms and suspended matter.

It suffices to add 0.8 ppm of chlorine to the water 1 in the pool 2 through the pipe 28.

During the treatment, it was shown that the membranes 12 could be unclogged once a week. To do this, it suffices to wash them for 30 minutes with 1 m³ of Javel water of 0.1 degree on the chlorometric scale, followed by washing for 30 minutes with 1 m³ of nitric acid at pH 4.

The membranes are then rinsed with 1 m³ of water in 30 minutes.

The disclosures of all of the prior art patents cited in this specification should be considered as being incorporated by reference herein.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the treatment of water from a swimming pool such as a municipal swimming pool, comprising the steps of
    conducting water from the pool to a recycling tank without passing through sand filters or diatomaceous filters,
    simultaneously conducting water from the tank to a separating apparatus without passing that water through any sand filters or diatomaceous filters,
    contacting the water with semi-permeable membrances in the separating apparatus, said membranes having a cut-off threshold of between 5,000 and 500,000,
    returning to the pool the fraction of water which passes through said membranes without passing that water through any sand filters or diatomaceous filters, and
    returning to the recycling tank the fraction of the water which has not passed through the semi-permeable membranes without passing that fraction through any sand filters or diatomaceous filters.

2. The process according to claim 1, wherein the water withdrawn from the pool is sent into a recycling tank without passing through any sand filters or diatomaceous filters, and is brought therefrom into contact with the semi-permeable membranes of the separating apparatus, the fraction of the water which has not passed through the semi-permeable membranes being returned to the recycling tank without passing through any second filters or diatomaceous filters, and is sent again into contact with said semi-permeable membranes.

3. The process according to claim 1, wherein the relative average pressure of the water circulating in a compartment of the separating apparatus upstream of said membranes is between 0.4 and 20 bar, the speed of circulation of the water in contact with the membranes in the upstream compartment being between 0.3 and 5 m/s.

4. The process according to claim 3, wherein the water pressure in said upstream compartment is between 0.5 and 5 bar.

5. The process according to claim 3, wherein said water speed is between 0.5 and 3 m/s.

6. The process according to claim 1, wherein water passing through said membranes is sterile and free of suspended matter.

7. Apparatus for the treatment of water from a swimming pool such as a municipal swimming pool comprising:
    a recycling tank,
    first conduit means for conducting water from the swimming pool to said recycling tank without passing that water through any sand filters or diatomaceous filters,
    a separating unit including upstream and downstream compartments with a semi-permeable membrane structure disposed between said upstream and downstream compartments, said membranes having a cut-off threshold of between 5,000 and 500,000,
    second conduit means separate from said first conduit means for conducting water from an outlet of said reycling tank to an inlet of said upstream compartment without passing that water through any sand filters or diatomaceous filters, wherein such water contacts said semi-permeable membrane structure,
    third conduit means for conducting, from an outlet of said upstream compartment, a fraction of water which has not passed through said semi-permeable membrane structure and delivering such water to said recycling tank without passing that water through any sand filters or diatomaceous filters, that water being recycled back to said separating unit, and
    fourth conduit means for conducting, from an outlet of said downstream compartment, a fraction of water which has passed through said semi-permeable membrane structure and delivering such water to the swimming pool without passing that water through any sand filters or diatomaceous filters.

8. Apparatus according to claim 7 including a first water pump in said first conduit means, a second water pump in said second conduit means, and control means for actuating said first and second pumps to maintain the water bevel in said recycling tank between selected high and low levels.

9. Apparatus according to claim 7 including control valve means for controlling the outflow of water from said upstream compartment to regulate the water pressure therein.

10. Apparatus according to claim 7 including a first discharge conduit for emptying said recycling tank, and a second discharge conduit for conducting water from said downstream compartment selectively to said recycling tank and a sewer to enable said semi-porous membrane structure to be cleaned.

11. Apparatus according to claim 7 including means for introducing air into said third conduit means to mix with water therein before such water is discharged into said recycling tank.

12. Apparatus according to claim 7 including means for introducing air into said second conduit means upstream of said separating unit.

13. Apparatus according to claim 7 including a control valve in said third conduit means, and a flow meter in said fourth conduit means for actuating said control to regulate water pressure in said upstream compartment as a function of the rate of water flow in said fourth conduit means.

14. Apparatus according to claim 7, wherein said membranes are anisotropic and said cut-off threshold is between 10,000 and 100,000.

* * * * *